United States Patent
Choi

(10) Patent No.: US 7,455,161 B2
(45) Date of Patent: Nov. 25, 2008

(54) CLUTCH OF AUTOMATIC TRANSMISSION

(75) Inventor: Young Sam Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 334 days.

(21) Appl. No.: 11/302,085

(22) Filed: Dec. 12, 2005

(65) Prior Publication Data

US 2007/0045077 A1  Mar. 1, 2007

(30) Foreign Application Priority Data

Aug. 23, 2005  (KR) ............... 10-2005-0077260

(51) Int. Cl.
*F16D 25/0632*  (2006.01)
(52) U.S. Cl. .................. 192/85 A; 192/66.21
(58) Field of Classification Search ..... 192/66.2–66.23, 192/85 A
See application file for complete search history.

(56) References Cited

U.S. PATENT DOCUMENTS

| | | | |
|---|---|---|---|
| 1,300,898 A | * | 4/1919 | Vincent .................. 192/85 A |
| 1,460,217 A | * | 6/1923 | Smith et al. ............. 192/66.21 |
| 4,010,833 A | | 3/1977 | Brendel et al. |
| 4,450,944 A | | 5/1984 | Fujioka et al. |
| 5,918,718 A | * | 7/1999 | Jahn et al. .............. 192/107 R |

FOREIGN PATENT DOCUMENTS

| | | | |
|---|---|---|---|
| JP | 05-141445 A | | 6/1993 |
| JP | 7-224859 A | * | 8/1995 |
| JP | 2000-352431 A | | 12/2000 |
| JP | 2001-336546 A | | 12/2001 |
| JP | 2002-213501 A1 | | 7/2002 |

* cited by examiner

*Primary Examiner*—Richard M. Lorence
(74) *Attorney, Agent, or Firm*—Morgan Lewis & Bockius LLP

(57) ABSTRACT

A first friction member supporting member is provided on an inner circumference of a clutch retainer and a second friction member supporting member is provided on an outer circumference of a hub. A piston is disposed within the clutch retainer and is moved by hydraulic pressure to thereby generate friction. A plurality of circumference protrusions having different inner diameters in a radial direction are formed respectively on the first and second friction member supporting members. The circumference protrusion of the second friction member supporting member is disposed to overlap with an inner circumference portion of the circumference protrusion of the first friction member supporting member. Surfaces of the circumference protrusions of the first and second friction member supporting members facing with each other are formed as corresponding slanted surfaces and friction members are disposed on the slanted surfaces of the circumference protrusions.

4 Claims, 3 Drawing Sheets

CLUTCH OF AUTOMATIC TRANSMISSION

CROSS-REFERENCE TO RELATED APPLICATION

This application claims priority to and the benefit of Korean Patent Application No. 10-2005-0077260 filed in the Korean Intellectual Property Office on Aug. 23, 2005, the entire contents of which are incorporated herein by reference.

BACKGROUND OF THE INVENTION (a) Field of the Invention

Generally, the present invention relates to a clutch of an automatic transmission of a vehicle. More particularly, the clutch has a minimized length in order to decrease a size of an automatic transmission and increase durability thereof.

(b) Description of the Related Art

Typical automatic transmissions include a torque converter and a powertrain of a multiple speed gear mechanism connected to the torque converter. In addition, a hydraulic control system is provided at an automatic transmission for selectively operating at least one operational element included in the powertrain depending on running states of a vehicle.

Such an automatic transmission includes a powertrain including a compound planetary gear set formed by combining at least two simple planetary gear sets to achieve required multiple speeds. A plurality of friction members and a hydraulic control system selectively operate the friction members of the powertrain depending on driving conditions. A friction member used for a powertrain of such automatic transmission may be a clutch or a brake, and the present invention generally relates to a wet type multiplate clutch.

As is generally known, the wet type multiplate clutch is configured such that a plurality of circular clutch plates and a plurality of circular clutch disks are alternately disposed in an axis direction and the clutch plate and the clutch disk are pressurized by a piston to generate friction therebetween, thereby transmitting power. In order to enhance torque capability, the number of the clutch plate and the clutch disk is generally increased. The increase of the number of clutch plates and clutch disks results in the drawback that a total length of an automatic transmission increases.

In Korean patent number 427665, a multipate clutch of an automatic transmission had been proposed which includes a plurality of clutch disks connected to a clutch hub. The combination rotates together with a transmission input shaft and is disposed around the transmission input shaft. A clutch plate is disposed between the clutch disks, formed as a cylindrical shape and divided into two portions, and performing a friction operation with the clutch disk while a diameter thereof is varied. A piston is installed to be movable in a radial direction of the transmission input shaft and pressurizes the clutch plate toward the clutch disk. Such multiplate clutch with a cylindrical shape may have wider friction surface thereby substantially increases torque transmission efficiency when compared to a conventional shaft direction disk type multiplate clutch. However, in such multiplate clutch, since the piston is disposed along a radial direction, there is a problem in that it is difficult to obtain sufficient hydraulic pressure supply passage. In addition, there is the drawback it is quite difficult to arrange the cylindrical clutch disk and plate to be movable in a radial direction.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a clutch of an automatic transmission that decreases a total length thereof and enhances durability by disposing friction members in a cylindrical shape and generating friction by a pressurizing force of a piston along a shaft direction.

According to a clutch of an automatic transmission in an embodiment of the present invention, a first friction member supporting member is provided in a protrusion/depression portion on an inner circumference of a clutch retainer connected to a transmission input shaft. A second friction member supporting member is provided in a protrusion/depression portion on an outer circumference of a hub acting as an output member. Also, a piston disposed within the clutch retainer is moved by hydraulic pressure and thereby generates friction between the first and second friction member supporting members. A plurality of circumference protrusions, having different inner diameters in a radial direction, are formed respectively on the first and the second friction member supporting members. The circumference protrusion of the second friction member supporting member is disposed to overlap with an inner circumference portion of the circumference protrusion of the first friction member supporting member. Surfaces of the circumference protrusions of the first and the second friction member supporting members facing with each other are formed as corresponding slanted surfaces. Friction members are disposed on the slanted surfaces of the circumference protrusions.

The circumference protrusions of the first and the second friction member supporting members may be doubly formed along a radial direction of the first and the second friction member supporting members. The circumference protrusions may be formed on separate members and may then be combined together to be doubly formed.

DETAILED DESCRIPTION OF THE EMBODIMENTS

Figure 1:
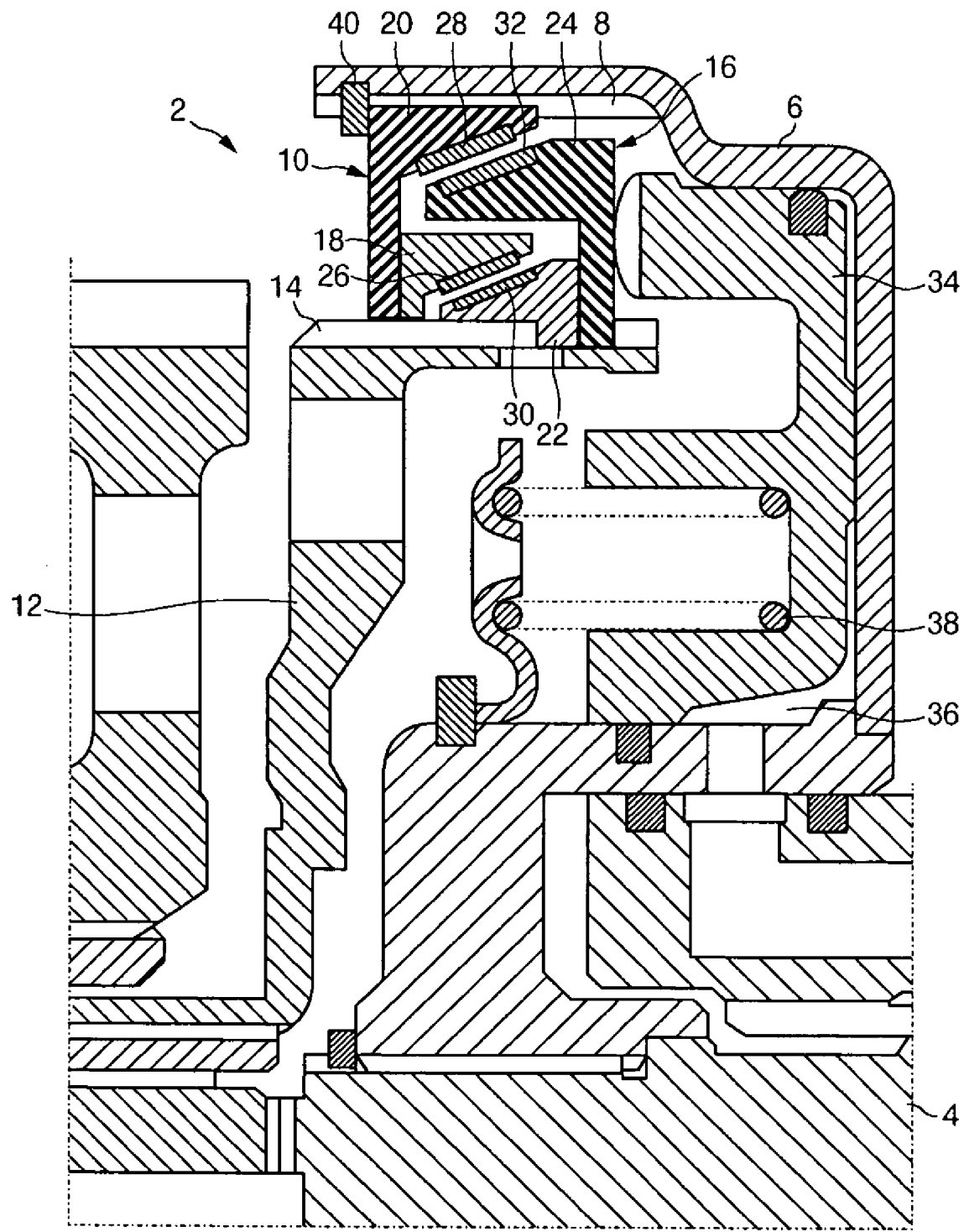
FIG. 1 is a partial cross-sectional view of a clutch according to an exemplary embodiment of the present invention.

Referring to FIG. 1, a clutch 2 according to an exemplary embodiment of the present invention, includes a cylindrical first friction member supporting member 10 disposed in a protrusion/depression portion 8 on an inner circumference of a clutch retainer 6 that is connected to a transmission input shaft 4. A second friction member supporting member 16, facing the first friction member supporting member 10, is disposed in a protrusion/depression portion 14 on an outer circumference of a hub 12 acting as an output member.

That is, the first and the second friction member supporting members 10 and 16 are formed as friction means. Inner and outer circumference protrusions 18 and 20 are formed along a radial direction on the first friction member supporting member 10, and inner and outer circumference protrusions 22 and 24 are formed along a radial direction on the second friction member supporting member 16. The circumference protrusions 22 and 24 of the second friction member supporting member 16 are disposed to overlap with an inner circumference of the circumference protrusions 18 and 20 of the of the first friction member supporting member 10, and surfaces of the circumference protrusions of the first and the second friction member supporting members facing with each other are formed as corresponding slanted surfaces. Friction members 26, 28, 30, and 32 are disposed on the slanted surfaces of the circumference protrusions.

Therefore, if pressure acting on the second friction member supporting member 16 is released, the first and the second friction member supporting members 10 and 16 are separated from each other so that friction therebetween does not occur. On the other hand, if pressure is applied to the second friction member supporting member 16, the second friction member supporting member 16 moves toward the first friction member supporting member 10. Accordingly, friction members 26 and 30 of the inner circumference protrusions 18 and 22 make contact and friction members 28 and 32 of the outer circumference protrusions 20 and 24 make contact, thereby friction therebetween occurs. In addition, a piston 34 is disposed within the clutch retainer 6 such that a hydraulic pressure chamber 36 is formed between the clutch retainer 6 and the piston 34. A return spring 38 of a compressed spring type applies constant pressure against the piston 34 toward the hydraulic pressure chamber 36.

Figure 2:
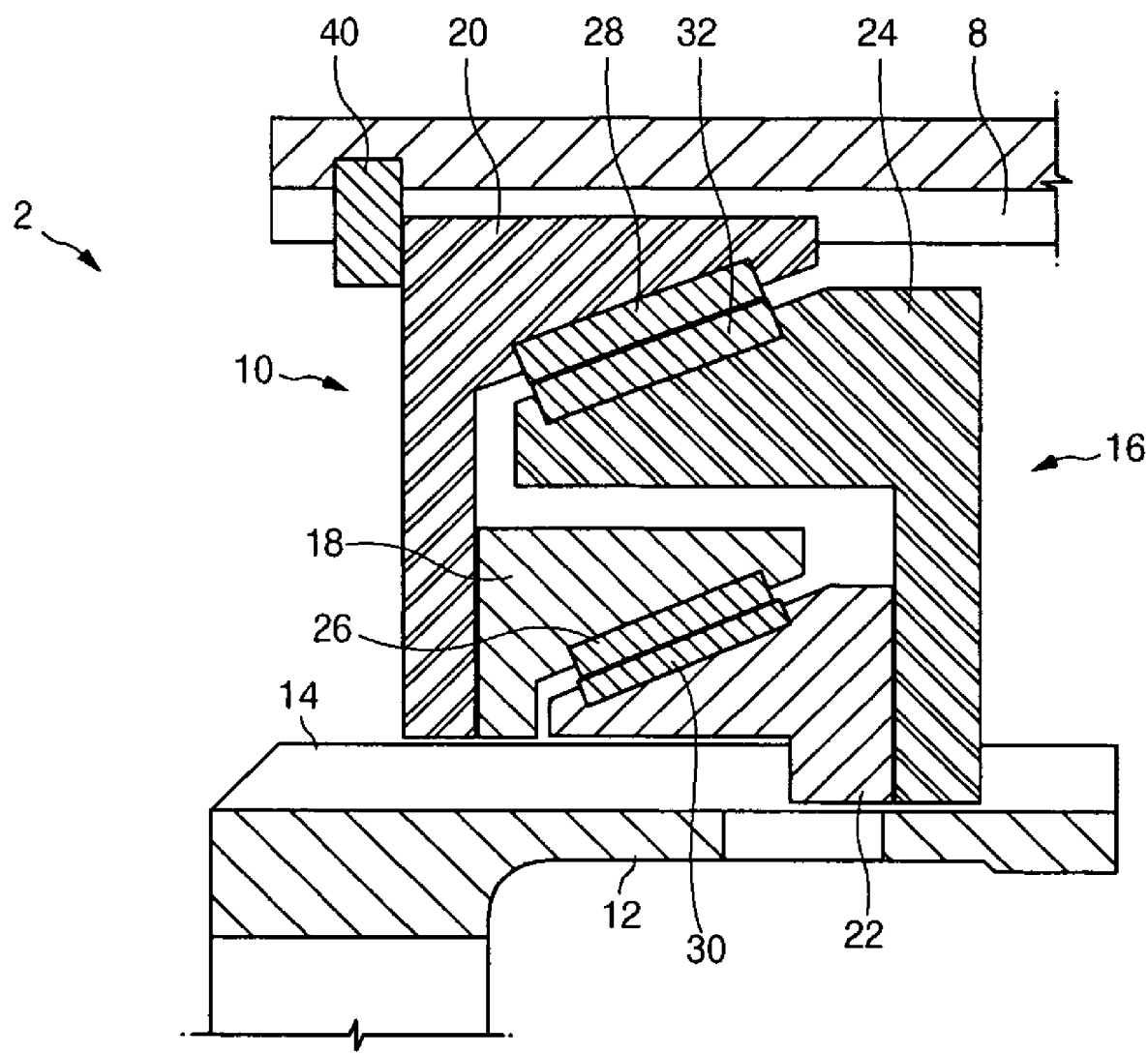
FIG. 2 is an enlarged view of a main portion of a clutch while the clutch is operating according to an embodiment of the present invention.
Figure 3:
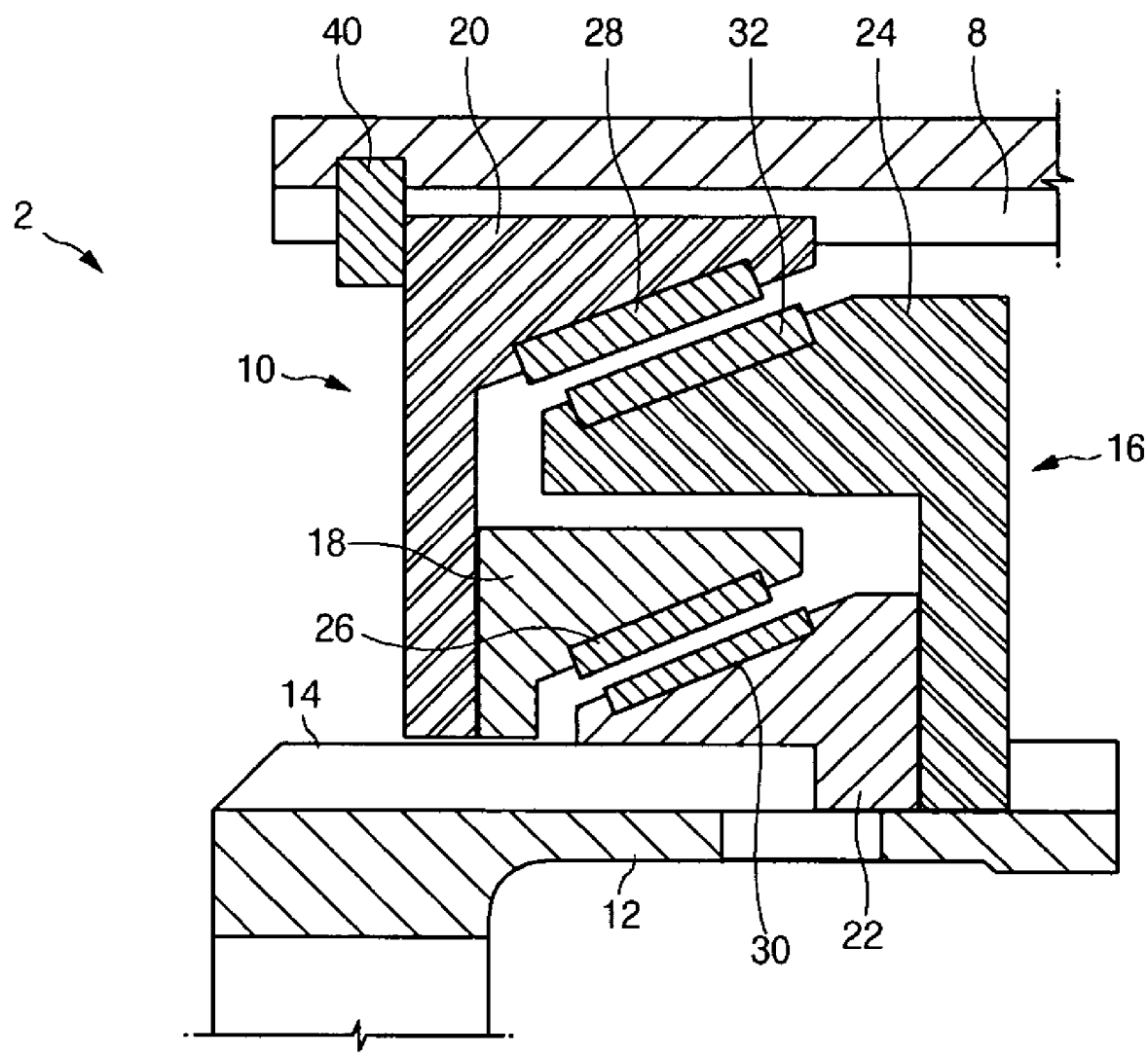
FIG. 3 is an enlarged view of a main portion of a clutch while the clutch is not operating according to an embodiment of the present invention.

Accordingly, if hydraulic pressure is supplied to the hydraulic pressure chamber 36, the piston 34 moves to the left in the drawing while overcoming an elastic force of the return spring 38 and thereby pushes the second friction member supporting member 16. Therefore, as shown in FIG. 2, friction members 26, 28, 30, and 32 of the first and the second friction member supporting members 10 and 16 contact each other, and friction therebetween occurs so that power input through the clutch retainer 6 is transmitted to the hub 12. On the other hand, if hydraulic pressure is released, the piston 34 moves to the right in the drawing by an elastic force of the return spring 38. Therefore, as shown in FIG. 3, the first and the second friction member supporting members 10 and 16 are separated from each other, so that power delivery is cut off.

The circumference protrusions 18, 22, 20, and 24 are doubly formed respectively on the first and the second friction member supporting members 10 and 16. According to alternative embodiments, the circumference protrusions can be formed in multiple components and coupled to each other by various methods such as welding, caulking, interlocking joints, bolting, combinations thereof, and the like.

According to some embodiments, angles of slanted surfaces of the circumference protrusions 18, 22, 20, and 24 are not limited to a specific angle, but can be varied depending on a vehicle to which a clutch is used. In addition, although two circumference protrusions are provided for each friction member supporting member in the above-stated exemplary embodiment, the scope of the present invention is not limited thereto, but three or four circumference protrusions can be provided. Even when three or four circumference protrusions are provided, a length along an axis line direction does not increase.

Reference numeral 40 in the drawing indicates a snap ring supporting the first friction member supporting member 10 in order to prevent the first friction member supporting member 10 from being shoved. According to an embodiment of the present invention, since friction members are disposed not along an axis line direction but along a radial direction, a total length of an automatic transmission can be substantially decreased. In addition, since the friction members overlap with each other in a cone shape, friction area can be maximized and thereby torque transmitted can be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clutch for an automatic transmission, comprising:
   a first friction member supporting member connected to and axially slidable along an inner circumference of a clutch retainer connected to a transmission input shaft;
   a second friction member supporting member connected to and axially slidable along an outer circumference of a hub acting as an output member;
   a piston disposed within the clutch retainer, movable by hydraulic pressure to thereby move the first and second friction member supporting members into contact with each other, such that friction is generated between the first and second friction member supporting members;
   at least one first protrusion on the first friction member supporting member and at least one second protrusion on the second friction member supporting member, wherein the protrusions protrude in a direction substantially perpendicular to a radial direction of the friction member supporting members, wherein the second protrusion overlaps with an inner circumference portion of the first protrusion; and
   a friction member disposed on each of the protrusions on a surface of the protrusion that faces the other protrusion.

2. The clutch of claim 1, wherein the at least one first protrusion comprises at least two first protrusions spaced apart from one another along the radial direction of the friction member supporting members, and wherein the at least one second protrusion comprises at least two second protrusions spaced apart from one another along the radial direction of the friction member supporting members.

3. The clutch of claim 2, wherein the first protrusions are attached to one another, and wherein the second protrusions are attached to one another.

4. The clutch of claim 1, wherein the surfaces of the protrusions are slanted with respect to the radial direction of the friction member supporting members.

* * * * *